United States Patent [19]

Miwa et al.

[11] Patent Number: 5,089,449
[45] Date of Patent: Feb. 18, 1992

[54] SILICON NITRIDE SINTERED BODIES

[75] Inventors: Shinichi Miwa, Nagoya; Seiichi Asami, Okazaki; Takehiro Kajihara, Komaki; Kouichi Imao, Kagamihara, all of Japan

[73] Assignee: NGK Insulators, Ltd., Japan

[21] Appl. No.: 486,922

[22] Filed: Mar. 1, 1990

[30] Foreign Application Priority Data

Mar. 1, 1989 [JP] Japan .................. 1-46567

[51] Int. Cl.[5] .................. C04B 35/58; F27B 9/10
[52] U.S. Cl. .................. 501/98; 501/97; 501/102; 501/103; 264/65
[58] Field of Search .................. 501/96, 97, 98, 102, 501/103; 264/65

[56] References Cited

U.S. PATENT DOCUMENTS 4,801,565  1/1989  Matsui .................. 501/98

FOREIGN PATENT DOCUMENTS 60-54976   3/1985  Japan .
60-246865  10/1987 Japan .

Primary Examiner—Mark L. Bell
Assistant Examiner—Michael A. Marcheschi
Attorney, Agent, or Firm—Parkhurst, Wendel & Rossi

[57] ABSTRACT

Silicon nitride sintered bodies including $Si_3N_4$ and at least one element selected from $Y_2O_3$, MgO, $ZrO_2$. In the silicon nitride bodies, a J phase solid solution is present in an intergranular phase, which satisfies a relation of $0.65x \leq y \leq x+2$ wherein y is an amount of J phase solid solution and x is an amount of $Y_2O_3$ as an additive.

7 Claims, 1 Drawing Sheet

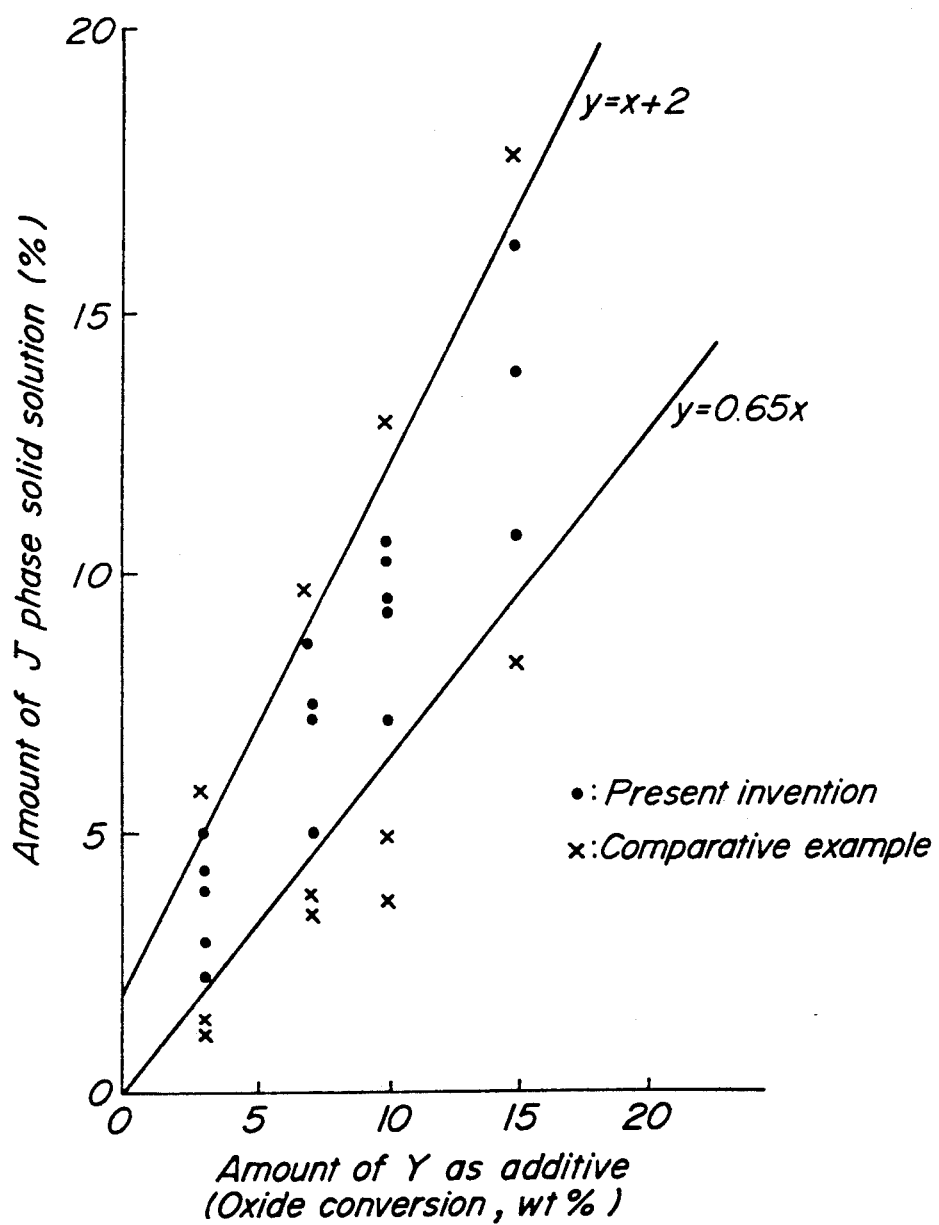
FIG_1

SILICON NITRIDE SINTERED BODIES

BACKGROUND OF THE INVENTION

1. Field of the Invention

The present invention relates to high density silicon nitride sintered bodies having excellent mechanical strength, oxidation resistance and static fatigue resistance.

2. Related Art Statement

Since silicon nitride sintered bodies have superior mechanical strength, heat resistance, heat shock resistance and corrosion resistance compared metallic materials, silicon nitride sintered bodies have been examined for use in a variety of mechanical parts used in high temperatures where metallic materials usually fail. The materials to be used for the mechanical parts which are to operate at such high temperatures need to have excellent mechanical characteristics at high temperatures as well as high oxidation resistance and static fatigue resistance from the standpoint of durability and dimensional stability during use of the parts for a long time period.

In order to obtain high density silicon nitride bodies, there have been known a pressureless sintering process, a pressure sintering process etc. Although various kinds of articles can be easily and inexpensively mass-produced by the pressureless sintering process, this process has drawbacks in that an amount of a sintering aid necessary for obtaining high density is greater and the high temperature strength and oxidation resistance are insufficient. On the other hand, although higher density sintered bodies can be obtained with a lesser amount of a sintering aid by the pressure sintering process, it has a major drawback that production costs become extremely high in the case of mass production of large sized articles having complicated shapes.

In order to solve the problems mentioned above, the applicant has proposed, in Japanese Patent Laid-open Publication No. 60-54,976, silicon nitride sintered bodies having high density, high strength and excellent oxidation resistance.

However, although silicon nitride sintered bodies having high mechanical strength and oxidation resistance can be obtained by this method, silicon nitride sintered bodies having sufficiently satisfying static fatigue characteristics, (SCG characteristics) which are important when in use as mechanical parts working particularly at high temperatures, cannot be obtained.

In order to further solve the problems mentioned above, the applicant has proposed, in U.S. Pat. No. 4,801,565, that silicon nitride sintered bodies having a J phase solid solution in an intergranular phase have high temperature strength, excellent oxidation resistance and excellent static fatigue characteristics. However, even by the method disclosed in U.S. Pat. No. 4,801,565, there is a drawback in that satisfying high temperature strength and excellent static fatigue characteristics cannot be always obtained when a state of J phase solid solution present in an intergranular phase is varied.

SUMMARY OF THE INVENTION

It is an object of the present invention to eliminate the drawbacks mentioned above and to provide silicon nitride sintered bodies which have high mechanical strength, excellent oxidation resistance and extremely excellent static fatigue resistance.

According to the present invention, a silicon nitride sintered body consisting essentially of $Si_3N_4$ as a main ingredient and at least one element selected from the group of $Y_2O_3$, $MgO$, $ZrO_2$, comprises an intergranular phase which consists mainly of a J phase solid solution, wherein an amount of J phase solid solution y satisfies the following formula with respect to an amount of $Y_2O_3$ (x) as an additive;

$$0.65x \leq y \leq x+2.$$

In the construction mentioned above, the J phase solid solution is herein used to mean a crystal phase having a caspidine structure of a monoclinic system represented by $M^I_3(M^{II}_2M^{III}_7)M^IM^{IV}_2$ such as $Ca_3(Si_2O_7)CaF_2$. In the silicon nitride sintered body according to the present invention in which the intergranular phase is crystallized, the crystallographic position of $M^I$ is occupied by Ca, a rare earth element such as Y, metal elements such as Mg, Fe, Ni, or the like, the crystallographic position of $M^{II}$ is occupied by Si, Al, or the like and the crystallographic position of $M^{III}$ is occupied by O, N, or the like while the crystallographic position of $M^{IV}$ is occupied by F, O, N, or the like. These crystalline phases can be identified by a powder X-ray diffraction method, and have the same type diffraction curve as that of $Si_3N_4 \cdot 4Y_2O_3 \cdot SiO_2$ shown in JCPDS card No. 32-1451.

Moreover, an amount of J phase solid solution in the sintered body is calculated from a method mentioned below. First, X-ray diffraction strengths from (101) plane and (210) plane of β silicon nitride powder are defined as $I_{\beta(101)}$ and $I_{\beta(201)}$, and X-ray diffraction Strengths from (102) plane and (210) plane of α silicon nitride powder are defined as $I_{\alpha(102)}$ and $I_{\alpha(210)}$. Then, X-ray diffraction strength from (131) plane of J phase is defined as $I_{J(131)}$, and an amount of J phase solid solution: y(%) is obtained from the following equation.

$$y = \frac{I_{J(131)}}{I_{\beta(101)} + I_{\beta(210)} + I_{\alpha(102)} + I_{\alpha(210)}} \times 100$$

BRIEF DESCRIPTION OF THE DRAWING

FIG. 1 is a graph showing a relation between an amount of J phase solid solution and an amount of $Y_2O_3$ as an additive.

DETAILED DESCRIPTION OF THE INVENTION

In the present invention, from the results of various examinations about an amount of J phase solid solution present in an intergranular phase disclosed in U.S. Pat. No. 4,801,565, we found that an amount of J phase solid solution does not necessarily correspond to an amount of Y even though it is generally predicted that an amount of J phase solid solution is corresponds to an additional amount of Y. Accordingly, we found that silicon nitride sintered bodies having a limit amount of J phase solid solution with respect to an additional amount of Y show high mechanical strength, high oxidation resistance and extremely excellent static fatigue characteristics. That is to say, we find that the silicon nitride sintered bodies having various good characteristics mentioned above can be obtained only in a range of $0.65x \leq y \leq x+2$ wherein y is an amount of J phase solid solution and x is an amount of $Y_2O_3$ added therein.

Reasons of defining an upper limit are as follows. In the present invention, a J phase solid solution present in an intergranular phase of the silicon nitride sintered body has a caspidine structure shown by $Y_4Si_2O_7N_2$. In the caspidine structure mentioned above, a part of Y can be substituted by an other element M and it can be explained as $(Y_{4-x}, M_x)Si_2O_7(N_2, O_x)$. As the element M, use is made of Mg, Fe, Ni, Ca, or the like. Therefore, an amount of J phase solid solution is substantially increased by the element M substituted therein besides an additional amount of Y. Moreover, we find that a maximum solution amount of the element M is about 20 atomic% as Mg after examining the J phase solid solution by using a transmission electron microscope and an element detecting apparatus.

As a result, when an amount of the element soluted in the J phase solid solution is increased, a strain in the J phase solid solution becomes larger, and the high oxidation resistance and the high melting point of the J phase solid solution are deteriorated. Therefore, various characteristics of the silicon nitride bodies are also deteriorated, and thus it is necessary to define the upper limit.

Further, reasons of defining a lower limit are as follows. It is not clear why an amount of J phase solid solution in the sintered body is decreased. However, it has been shown experimentally that an amount of J phase solid solution is decreased due to a long firing period. Therefore, it is estimated that $\alpha \rightarrow \beta$ transformation in the silicon nitride is finished by elongating a firing period and an amount of $Si_3N_4$ in an intergranular phase is decreased. As a result, a sufficient solution amount necessary for generation of J phase solid solution cannot be obtained in an intergranular phase. In this manner, a part of Y generates the J phase solid solution and the other part of Y remains in a glass phase of the intergranular phase, and thus an amount of J phase solid solution is decreased.

A part of the added Y does not generate a crystal having a high melting point, and a glass phase is generated from the other additives or impurities. Therefore, an increase of glass phase in the intergranular phase deteriorates various characteristics at high temperatures, and thus it is necessary to define the lower limit.

Moreover, an increase of glass phase not only deteriorates high temperature strength but also decreases maximum stress under which test pieces did not fracture when exposed at 900° C. for 1000 hours. This is due to a softening and oxidation of the glass phase under high temperatures.

EXAMPLE

A powdery raw material of silicon nitride having a purity of 97.2% by weight, an average grain diameter of 0.7 μm and a BET specific surface area of 11 m²/g, and a powdery raw material of $Y_2O_3$, $Yb_2O_3$, MgO, $ZrO_2$ each having a purity of above 99% by weight, an average grain diameter of 1.2 to 0.5 μm and a BET specific surface area of 20 to 12 m²/g were formulated as shown in Table 1.

By using ferrous media having an outer diameter of 7 mm and a nylon resin vessel having an inner volume of about 1.5 l, 500 g of the media and 500 ml of resin solvent were added to 200 g of the formulation raw material, which was milled by a vibration mill at a vibration rate of 1,200 times/min for 12 hours.

The resin solvent was evaporated to obtain a dry powder, and the thus obtained dry powder was further granulated till passing through a sieve of 149 μm. The thus obtained granulated powder had an average grain diameter of 60 to 90 μm. Next the granulated powder was molded by using a metal mold, and then isostatically press molded into a shape of 60×60×10 mm at a pressure of 5.6 tf/cm². A resulting molding was pressurelessly sintered at a firing temperature shown in Table 1 under a nitrogen atmosphere, and thereafter reheated at 1200° C. for 3 hours.

After reheating the sintered bodies, test pieces each having a shape defined by JIS R1601 were obtained by machining the reheated sintered body, and four point bending strengths at room temperature and 1200° C. were measured according to JIS R1601. The intergranular crystalline phase of the sintered body was identified from an X-ray diffraction analysis using a CuKα line. Moreover, with respect to the measurement of the fatigue characteristics, the maximum stress under which the test piece did not fracture when exposed at 800° C. or 900° C. for 1000 hours also was measured. Further, a relative density was measured by using an image analyzing apparatus with respect to a photograph of the microstructure of the sintered body after polishing and rapping the sintered body. The results of the above measurements were shown in Table 1.

TABLE 1

| | Formulated composition (wt %) | | | | Firing temperature (°C.) | Crystalline phase at grain boundaries (amount of J phase %) | Four point bending strength (MPa) | | Relative density (%) | Static fatigue characteristics maximum stress under which test piece did not fracture (MPa) | |
|---|---|---|---|---|---|---|---|---|---|---|---|
| Sample No. | $Si_3N_4$ | $Y_2O_3$ conversion | MgO conversion | $ZrO_2$ conversion | | | RT | 1200° C. | | when exposed at 900° C. for 1000 hours | when exposed at 800° C. for 1000 hours |
| Present Invention | | | | | | | | | | | |
| 1 | 95.5 | 3.0 | 1.0 | 0.5 | 1690 × 1 hr | 5.0 | 740 | 620 | 95 | 620 | 640 |
| 2 | 94.5 | 3.0 | 2.0 | 0.5 | 1670 × 1 hr | 3.9 | 810 | 680 | 97 | 640 | 670 |
| 3 | 95.5 | 3.0 | 1.0 | 0.5 | 1660 × 1 hr | 4.3 | 750 | 700 | 96 | 600 | 660 |
| 4 | 94.5 | 3.0 | 2.0 | 0.5 | 1670 × 1 hr | 2.2 | 790 | 650 | 97 | 600 | 630 |
| 5 | 95.0 | 3.0 | 1.0 | 1.0 | 1690 × 1 hr | 2.8 | 770 | 660 | 94 | 620 | 660 |
| 6 | 90.5 | 7.0 | 2.0 | 0.5 | 1670 × 1 hr | 7.5 | 830 | 810 | 97 | 680 | 750 |
| 7 | 88.5 | 7.0 | 4.0 | 0.5 | 1670 × 1 hr | 5.0 | 890 | 850 | 98 | 760 | 800 |
| 8 | 88.0 | 7.0 | 4.0 | 1.0 | 1670 × 1 hr | 8.8 | 880 | 830 | 97 | 740 | 790 |
| 9 | 88.0 | 6.0 1.0($Yb_2O_3$) | 4.0 | 0.5 | 1670 × 1 hr | 7.3 | 920 | 800 | 97 | 720 | 780 |
| 10 | 86.5 | 10.0 | 3.0 | 0.5 | 1650 × 1 hr | 9.6 | 890 | 820 | 98 | 700 | 790 |
| 11 | 82.5 | 10.0 | 6.5 | 1.0 | 1650 × 1 hr | 7.2 | 900 | 810 | 97 | 700 | 770 |
| 12 | 83.0 | 10.0 | 6.5 | 0.5 | 1650 × 1 hr | 10.7 | 830 | 790 | 97 | 660 | 750 |
| 13 | 81.5 | 15.0 | 3.0 | 0.5 | 1650 × 1 hr | 16.3 | 800 | 720 | 96 | 660 | 690 |
| 14 | 77.5 | 15.0 | 7.0 | 0.5 | 1650 × 1 hr | 14.0 | 760 | 690 | 97 | 620 | 670 |

TABLE 1-continued

| Sample No. | Formulated composition (wt %) | | | | Firing temperature (°C.) | Crystalline phase at grain boundaries (amount of J phase %) | Four point bending strength (MPa) | | Relative density (%) | Static fatigue characteristics maximum stress under which test piece did not fracture (MPa) | |
| | Si₃N₄ | Y₂O₃ conversion | MgO conversion | ZrO₂ conversion | | | RT | 1200° C. | | when exposed at 900° C. for 1000 hours | when exposed at 800° C. for 1000 hours |
|---|---|---|---|---|---|---|---|---|---|---|---|
| 15 | 77.5 | 15.0 | 7.0 | 0.5 | 1650 × 1 hr | 10.8 | 730 | 710 | 97 | 640 | 680 |
| 16 | 83.0 | 7.0 3.0(Yb₂O₃) | 6.5 | 0.5 | 1650 × 1 hr | 9.4 | 790 | 770 | 97 | 680 | 740 |
| 17 | 83.0 | 8.0 2.0(Yb₂O₃) | 6.5 | 0.5 | 1650 × 1 hr | 10.3 | 840 | 830 | 97 | 720 | 780 |
| Comparative Example | | | | | | | | | | | |
| 1 | 95.5 | 3.0 | 1.0 | 0.5 | 1690 × 2 hr | 1.5 | 720 | 500 | 94 | 450 | 580 |
| 2 | 94.5 | 3.0 | 2.0 | 0.5 | 1670 × 2 hr | 1.2 | 800 | 590 | 95 | 380 | 530 |
| 3 | 88.0 | 7.0 | 4.0 | 1.0 | 1650 × 1 hr | 9.8 | 830 | 820 | 97 | 480 | 780 |
| 4 | 88.5 | 7.0 | 4.0 | 0.5 | 1690 × 3 hr | 3.9 | 930 | 700 | 97 | 360 | 730 |
| 5 | 83.0 | 10.0 | 6.5 | 0.5 | 1690 × 4 hr | 5.0 | 840 | 690 | 95 | 340 | 740 |
| 6 | 82.5 | 10.0 | 6.5 | 1.0 | 1650 × 1 hr | 13.0 | 810 | 770 | 97 | 520 | 730 |
| 7 | 86.5 | 10.0 | 3.0 | 0.5 | 1690 × 3 hr | 3.8 | 920 | 740 | 98 | 320 | 690 |
| 8 | 77.5 | 15.0 | 7.0 | 0.5 | 1650 × 1 hr | 18.1 | 820 | 780 | 96 | 480 | 710 |
| 9 | 77.5 | 15.0 | 7.0 | 0.5 | 1650 × 4 hr | 8.4 | 850 | 680 | 97 | 300 | 640 |
| 10 | 88.5 | 6.0 1.0(Yb₂O₃) | 4.0 | 0.5 | 1670 × 3 hr | 3.5 | 840 | 650 | 97 | 340 | 650 |
| 11 | 94.5 | 3.0 | 2.0 | 0.5 | 1650 × 1 hr | 6.2 | 820 | 700 | 97 | 480 | 710 |

From the results of Table 1 and FIG. 1 showing a relation of an amount of J phase solid solution and that of Y, it is apparent that the sample Nos. 1~17 according to the invention satisfying a relation of $0.65x \leq y \leq x+2$ wherein y is an amount of J phase solid solution and x is an amount of $Y_2O_3$ as an additive show excellent characteristics such as mechanical strength at high temperatures with respect to the sample Nos. 1~10 according to the comparative example falling outside the relation mentioned above.

As can be seen from the above, according to the present invention, the silicon nitride bodies having extremely excellent mechanical strength, high oxidation resistance and static fatigue characteristics can be obtained by generating a J phase solid solution in an intergranular phase and by satisfying a predetermined relation between an amount of J phase solid solution and an amount of $Y_2O_3$.

What is claimed is:

1. A silicon nitride sintered body consisting essentially of $Si_3N_4$ as a main ingredient and about 3-15 wt.% $Y_2O_3$, about 1-7 wt.% MgO and about 0.5-1.00/g wt.% $ZrO_2$. comprising an intergranular phase consisting essentially of a J phase solid solution, wherein an amount of J phase solid solution: y, satisfies the following formula with respect to an amount of $Y_2O_3$: x, as an additive;

$0.65x \leq y \leq x+2$.

2. A silicon nitride sintered body according to claim 1, wherein a part of $Y_2O_3$ is substituted by an oxide of a rare earth element.

3. A silicon nitride sintered body according to claim 1, wherein said J phase solid solution has a crystal phase having a caspidine structure of a monoclinic system represented by the formula: $M_3^I(M_2^{II}M_7^{III})M^IM^{IV}_2$, wherein $M^I$ is an element selected from the group consisting of Y, Mg, Fe and Ni; $M^{II}$ is an element selected from the group consisting of Si and Al; $M^{III}$ is an element selected from the group consisting of O and N; and $M^{IV}$ is an element selected from the group consisting of F, O and N.

4. The silicon nitride sintered body of claim 1, wherein said sintered body has a strength of about 630-800 MPa while being maintained at 800° C. for 1,000 hours.

5. The silicon nitride sintered body of claim 1, wherein said sintered body has a strength of about 600-760 MPa while being maintained at 900° for 1,000 hours.

6. The silicon nitride sintered body of claim 1, wherein said sintered body has a strength of about 730-920 MPa at room temperature.

7. The silicon nitride sintered body of claim 1, wherein said sintered body has a strength of about 620-850 MPa at 1200° C.

* * * * *